United States Patent

Sayama

Patent Number: 5,809,046
Date of Patent: Sep. 15, 1998

[54] METHOD AND A SYSTEM FOR FAST ADJUSTING DATA RECEIVING MODEM

[75] Inventor: Katsumi Sayama, Yokohama, Japan

[73] Assignee: Ricoh Company, Ltd., Japan

[21] Appl. No.: 683,572

[22] Filed: Jul. 15, 1996

[30] Foreign Application Priority Data

Jul. 14, 1995 [JP] Japan ................................. 7-200293

[51] Int. Cl.⁶ .................................................. G06F 11/00
[52] U.S. Cl. ............................................. 371/5.5; 371/2.1
[58] Field of Search ............................... 371/5.5, 5.1, 2.1, 371/5.4

[56] References Cited

U.S. PATENT DOCUMENTS 5,058,134  10/1991  Chevillat et al. ..................... 375/39
5,189,617   2/1993  Shiraishi .......................... 364/424.05

Primary Examiner—Phung M. Chung
Attorney, Agent, or Firm—Knoble & Yoshida LLC

[57] ABSTRACT

The current invention generally discloses a method of and a system for adjusting a data receiving machine to a sudden change in the data transmission condition in order to minimize data losses. In order to achieve this goal, a fast adjusting data receiving process or modem is responsive to a sudden hit in a transmission line and corrects the sudden phase error by modifying an error correction coefficient rather than relying upon a slow error correction process based upon an average error detection.

20 Claims, 4 Drawing Sheets

| TRANSMISSION SPEED | S/N | α | β1 | β2 |
|---|---|---|---|---|
| 9600bps | 16dB | 200H | 2000H | 5000H |
| 7200bps | 12dB | 400H | 2800H | 6000H |
| 4800bps | 11dB | 800H | 2000H | 6000H |
| 2400bps | 4dB | 1000H | 2800H | 6000H |

METHOD AND A SYSTEM FOR FAST ADJUSTING DATA RECEIVING MODEM

FIELD OF THE INVENTION

The current invention is generally related to a method of and a system for adjusting a data receiving machine to a sudden change in the data transmission condition, and more particularly related to a fast adjusting data receiving process or a fast adjusting modem responsive to a sudden hit in a transmission line to substantially minimize data loss.

BACKGROUND OF THE INVENTION

For the transmission of data between a data sending machine and a data receiving machine such as data modems, data signals are generally encoded before transmission over an analog line such as a telephone line and subsequently decoded upon receipt. The transmission rules are also known as transmission protocols and are standardized by some organizations such as ITU-T. Protocols V.29 and V.27ter are designed for relatively fast transmissions and are respectively up to 9600 bits per second (bps) using 16 bit quadrature amplitude modulation (QAM) and up to 7200 bps using 8 phase shift modulation.

Because of the above high-speed encoding and decoding processes in order to communicate with each other, the two modems have to establish a number of common transmission rules such as a transmission speed and an error detection before the user data is transmitted. To establish a common operational mode, a data transmitting modem sends a data receiving modem a sequence of training data which trains the receiving modem among other things how to correct the out of phase data. The training data also adjusts a data demodulation unit of the receiving modem to match a demodulation unit of the sending modem for signal processing. The training sequence is generally performed within a short period of time before the user data transmission.

After the receiving data equipment is trained to match the sending data equipment, the user data is transmitted. During the user data transmission, the receiving data equipment monitors the correct receipt of the user data and the predetermined signal processing of the received data. For example, if the user data signal is out of phase, the receiving data equipment generally detects the error over a predetermined duration of the sampled signals and computes an average or the mean-square error as disclosed in U.S. Pat. No. 5,058,134, issued to Chevillat et al. Based upon the average or the mean-square value, the receiving data machine gradually adjusts the phase errors. The slow follow-up speed is usually set so that the white back ground noise during the user data transmission does not unnecessarily cause the error correction. Although the above described slow follow-up speed for the phase error correction is not always desirable for a data loss, a faster follow-up speed increases the sensitivity of the error correction process and unnecessarily causes the error correction process over the white noise.

Furthermore, the difficulty in correcting the data transmission errors includes sudden bursts or unpredictable hits over a data transmission line during the user data transmission. The hits include phase hits which cause the sudden phase displacement of the data signal, amplitude hits which cause sudden spikes in the amplitude, and impulse noises which occur in the transmission line. When these hits occur, it generally takes some time for the receiving data equipment to detect the errors and correct the errors. Unfortunately, when these hits occur during the user data transmission, due to the above described slow response of the receiving machine, a large amount of the user data is lost.

SUMMARY OF THE INVENTION

In order to solve the above and other problems, according to one aspect of the current invention, a method of adjusting a data receiving condition for minimizing data receiving errors during data transmission, includes the steps of: a) sampling data transmission errors; b) adjusting a data receiving control parameter based upon an average of the data transmission errors sampled in the step a), the adjusted data receiving control parameter minimizing the data receiving errors; and c) adjusting an error correction coefficient in response to one of the data transmission errors also sampled in the step b), the adjusted error correction coefficient modifying the data receiving control parameter in a substantially faster manner than the step b) during the data transmission.

According to a second aspect of the current invention, A method of correcting a phase error in data received by a modem during data transmission, includes the steps of: a) sampling data transmission errors; b) determining an average amount of the phase error in the sampled data; c) slow adjusting the phase error based upon the average of the phase error; and d) fast adjusting the phase error by modifying a correction coefficient in response to one of the data transmission errors sampled in the step a), the adjusted error correction coefficient modifying the phase error in a substantially faster manner than the step c) during the data transmission.

According to a third aspect of the current invention, a system for adjusting a data receiving condition for minimizing data receiving errors during data transmission, includes: an error sampling unit for sampling data transmission errors; a slow error adjusting unit connected to the error sampling unit for adjusting a data receiving control parameter based upon an average of the data transmission errors, the adjusted data receiving control parameter minimizing the data receiving errors; and a fast error adjusting unit connected to the error sampling unit for adjusting an error correction coefficient in response to one of the data transmission errors, the adjusted error correction coefficient modifying the data receiving control parameter in a substantially faster manner than the slow error adjusting unit during the data transmission.

According to a fourth aspect of the current invention, a system for correcting a phase error in data received by a modem during data transmission, includes: an error sampling unit for sampling data transmission errors; an error processing unit for determining an average amount of the phase error in the sampled data; a slow error correction unit connected to the error processing unit for adjusting the phase error based upon the average of the phase error; and a fast error correction unit connected to the error sampling unit for adjusting the phase error by modifying a correction coefficient in response to one of the data transmission errors, the adjusted error correction coefficient modifying the phase error in a substantially faster manner than the slow error correction unit during the data transmission.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
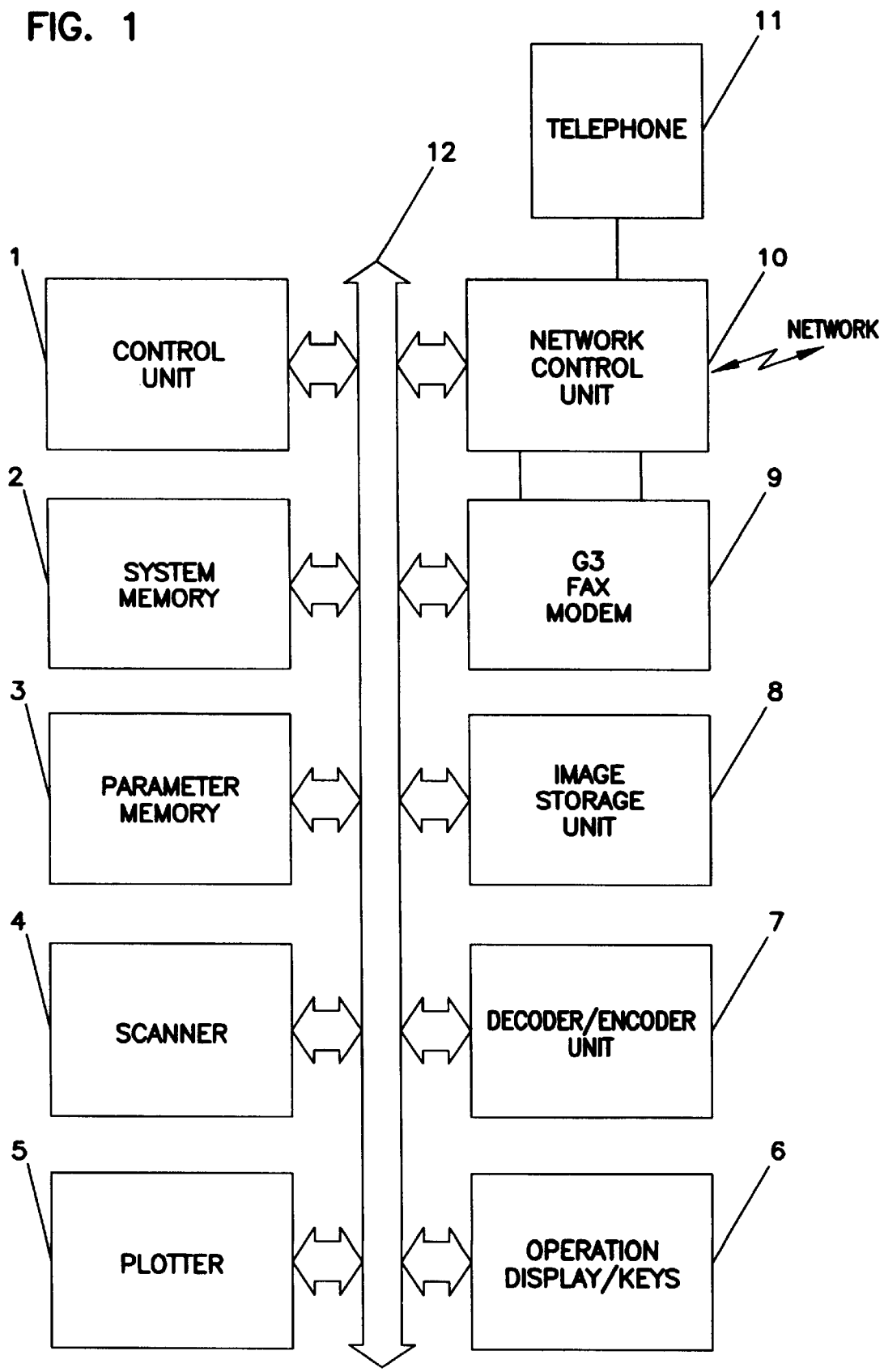
FIG. 1 is a block diagram illustrating one preferred embodiment of data terminal equipment such as a facsimile machine including a Group 3 FAX modem according to the current invention.

Referring now to the drawings, wherein like reference numerals designate corresponding structure throughout the views, and referring in particular to FIG. 1, one preferred embodiment of the data sending and receiving machine such as a Group-3 facsimile machine according to the current invention is described by a block diagram. The preferred embodiment includes a control unit 1, a system memory 2, a parameter memory 3, a scanner unit 4, a plotter unit 5, an operation display unit 6, a decoder/encoder unit 7, an image storing unit 8, a Group-3 FAX modem 9, a network control unit 10 and a telephone 11. The above listed components are connected by an internal bus 12, and the data is internally sent between these components.

The control unit 1 controls the data transmission as well as data reception processes which involve the above listed components of the facsimile machine. The transmission and reception processes are further controlled by a software program which runs in the system memory 2 and also controlled by certain parameter values or predetermined information stored in the parameter memory 3. In addition, the control unit 1 also controls the connection of the network line to the facsimile machine or to the telephone 11 for regular voice communication.

The facsimile machine includes the input as well as output devices for image processing. In order to transmit an image, a scanner reads the image, and the scanned input data is processed by the encoder 7. The processed image data is generally encoded and compressed. The processed data is then stored in the image storage unit 8 before it is transmitted via the G-3 FAX modem 9 and the network control unit 10 over the network. The modem 9 and the network control unit 10 are also directly connected by a separate channel as indicated by the lines between the two units. On the other hand, when the data is received by the modem 9 from the network, the received data is decompressed and decoded by the decoder 7 before it is plotted by the plotter 5. The above described operations are specified by predetermined keys and displayed in the operation display unit 6.

The Group-3 FAX modem 9 is implemented according to either a low-speed protocol such as V.21 or a high-speed protocol such as V.29 or V.27ter, which is more suitable for the transmission of image information.

Figure 2:
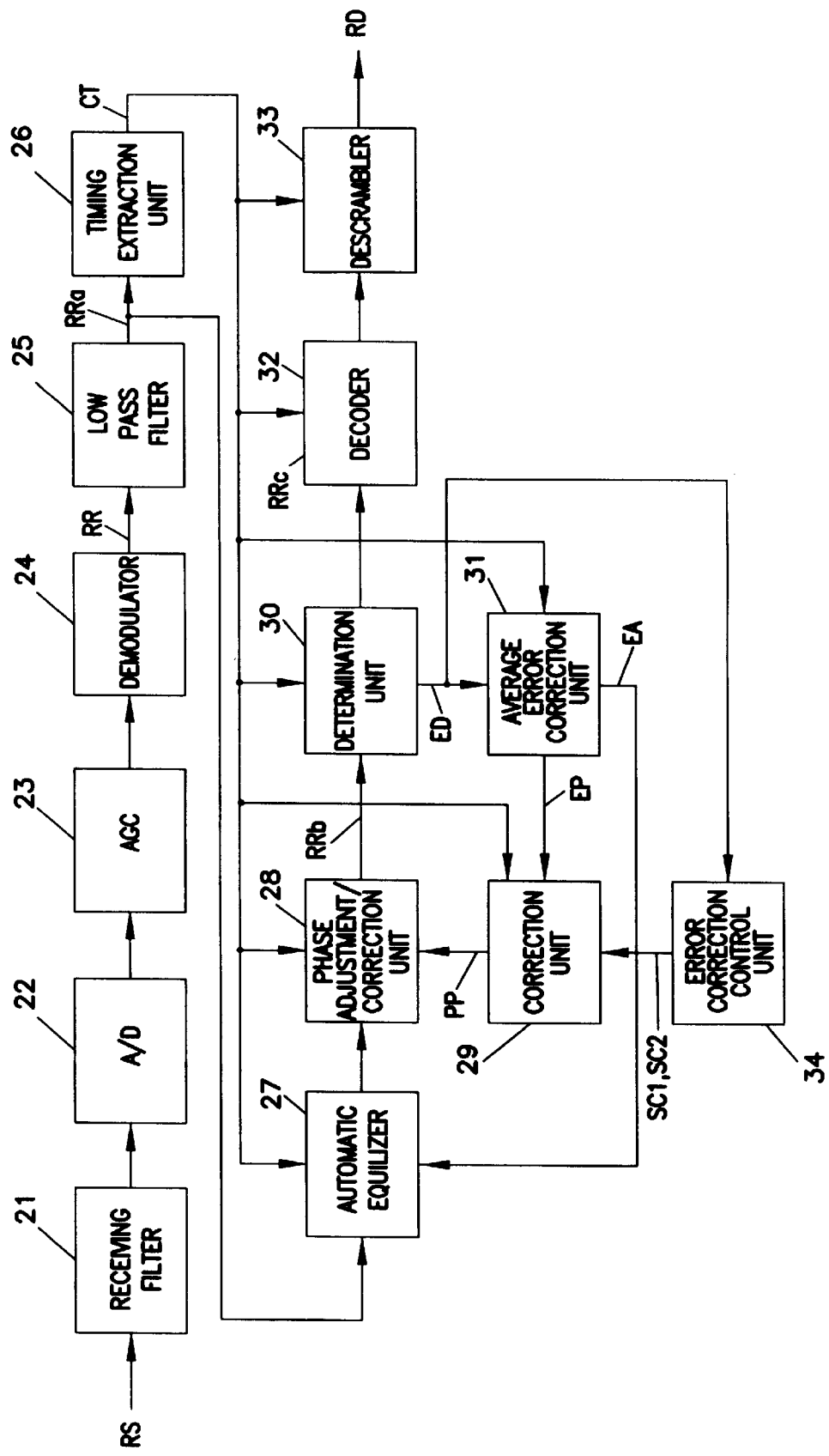
FIG. 2 is a block diagram illustrating one preferred embodiment of a data terminal equipment including a fast error correction unit and a slow error correction unit according to the current invention.

Now referring to FIG. 2, according to one preferred embodiment of the current invention, the modem such as the Group-3 FAX modem is shown in a block diagram to illustrate its components. These components are related to data reception, and each component will be described for its role in the data reception function. The received signal RS undergoes a low pass receiving filter 21 to remove the high frequency white noise before it is converted back to a digital signal by an A/D converter 22. The digital signal then undergoes an automatic gain control unit 23 to control its amplitude, and the signal is demodulated by a demodulator 24. The demodulated signal RR is filtered by another low pas filter to further remove high frequency components to output a RRa signal.

The twice filtered signal RRa is now inputted into an automatic equalizer unit 27 and a timing extraction unit 26 in parallel for further processing. An extracted timing signal CT is simultaneously inputted into the automatic equalizer 27, a phase adjustment/correction unit 28, a correction unit 29, a determination unit 30, an average error correction unit 31, a decoder 32 and a descrambler 33. The automatic equalizer unit 27 equalizes the twice filtered signal RRa in response to an amplitude error signal EA sent from the average error correction unit 31. The equalized output signal is inputted into the phase adjustment/correction unit 28, which in turn makes a phase adjustment of the waveform signal based upon the clock signal CT and an adjustment value PP from the correction unit 29. A phase corrected signal RRb is now sent to the determination unit 30.

The determination unit 30 ultimately determines an amount of error in the processed RRb signal. In order to determine an error amount ED, the determination unit 30 first determines to which signal constellation in a predetermined signal space the current corrected signal RRb belongs. Then, the determination unit 30 determines the error amount ED between the assumed constellation point and the corrected RRb signal. The error amount ED is expressed in a phase difference as well as an amplitude difference. An assumed constellation or correct signal RRC is sent to the decoder 32 and in turn to the descrambler to generate a received data signal RD. The error amount signal ED is sent to the average error correction unit 31 as well as to an error correction control unit 34.

Still referring to FIG. 2, the average error correction unit 31 processes each sampled signal to determine an average difference in phase as well as amplitude based upon the ED signal which indicates a difference between the assumed correct signal RRC and the corrected RRb signal. The average correction unit 31 generates an EP signal indicative of an averaged phase error and outputs the EP signal into the correction unit 29. At the same time, the average correction unit 31 generates an EA signal indicative an averaged amplitude error and outputs the EA signal into the automatic equalizer unit 27. The correction unit 29 receives error correction coefficients SC1 and SC2 from the error correction control unit 34 and further processes the EP signal with the error correction coefficients SC1 and SC2 to generate a phase correction value signal PP indicative of a data receiving control parameter. The correction unit 29 sends the PP signal to the phase adjustment/correction unit 28.

The error correction control unit 34 generates SC1 and SC2 error correction coefficients based upon the ED signal from the determination unit 30. As described above, the ED signal is not an averaged signal but rather the error amount between the assumed constellation point and an individual corrected RRb signal. In other words, since the error correction control unit 34 does not take an average, the error correction control unit 34 is more responsive in detecting a sudden hit or a burst in the transmission line and in adjusting the error correction coefficients SC1 and/or SC2 than the average error correction unit 31. Additional descriptions on the processes performed by the error correction control unit 34 will be later provided with respect to FIGS. 4 and 6.

Figure 3:
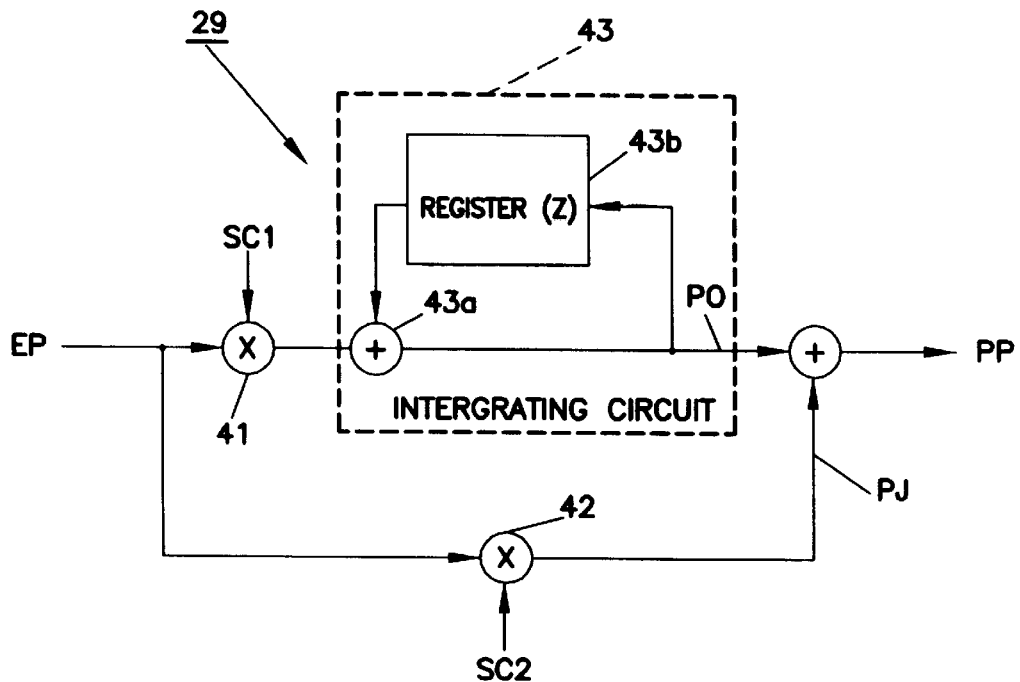
FIG. 3 is a block diagram illustrating some details of the fast error correction unit including two error correction coefficients as well as the slow error correction unit according to one preferred embodiment of the current invention.

Now referring to FIG. 3, one preferred embodiment of the correction unit 29 is shown in a block diagram according to the current invention. As described above with reference to FIG. 2, the correction unit 29 receives error correction coefficient signals SC1 and SC2 from the error correction unit 34 in order to modify the averaged phase difference signal EP from the average error correction unit 31. A first multiplication unit 41 multiplies the EP signal by the SC1 error coefficient, and the product is sent to an integration circuit 43. In the integration circuit 43, a register Z 43b temporarily stores a sum value from a first addition unit 43a which adds the product to the stored sum, and an output signal PO is generated. The EP signal is also multiplied by the SC2 signal by a second multiplication unit 42 so that a second addition unit 42a generates a PP signal by adding the product signal PJ and the PO signal from the integration circuit 43.

The PO signal generally represents an offset component of the phase error while the PJ signal generally represents a jitter component of the phase error. The jitter component is usually related to sudden phase changes caused by the hits or the bursts in the transition line. For this reason, by enlarging the SC2 coefficient value in response to the phase hits, the PJ signal is immediately adjusted. As a result, it takes a shorter period of time to correct the sudden phase error by the adjusted PP signal rather than modifying the PO signal. In other words, the enlarged PJ signal value increases the follow-up speed of the phase adjustment/correction unit 28 to adjust to the sudden phase change. As described above, the PJ signal is adjusted by modifying the error correction coefficient SC2.

Figure 4:
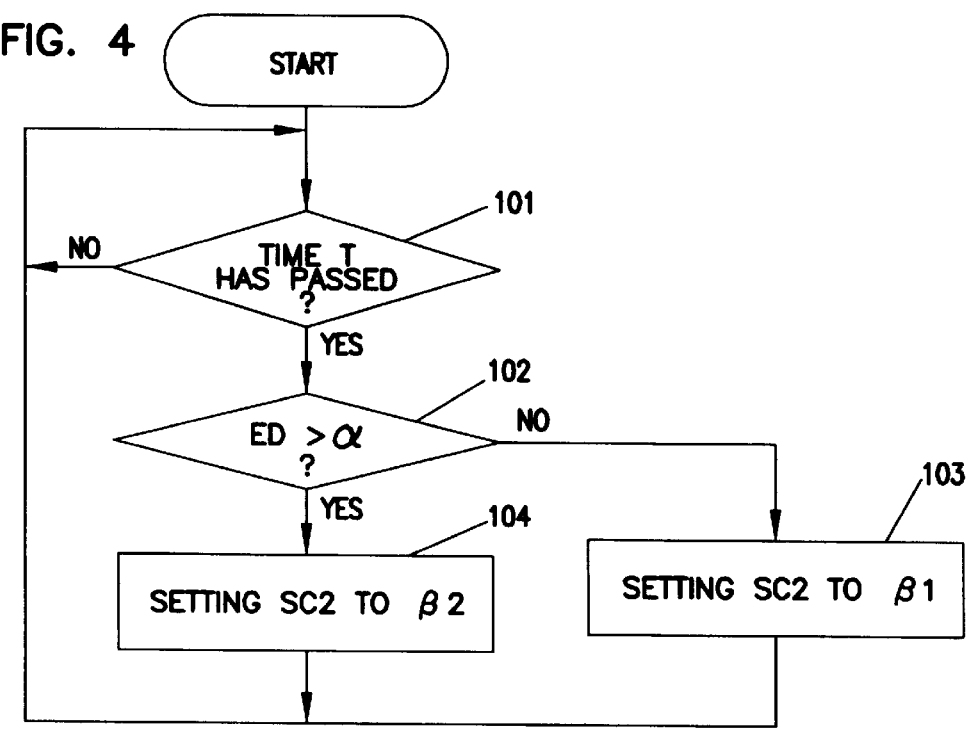
FIG. 4 is a flow chart illustrating one preferred process of adjusting an error correction coefficient based upon a predetermined comparison value according to the current invention.

Now referring to FIG. 4, one preferred process of determining a SC2 value for a desirable follow-up speed is illustrated in a flow chart according to the current invention. It is determined in a step 101 whether a predetermined time T has passed. One consideration for setting the predetermined time T includes the criticality of data loss during the data transmission. If the data loss is critical, the error sampling should be frequent by setting a short time T. However, the shorter sampling time consumes computing resources for frequent error sampling, and the data transmission may be affected by the frequent error checking. On the other hand, the data loss is not that critical, the predetermined time T may be set relatively large to have less frequent error checking.

Still referring to FIG. 4, when the error checking is due according to the step 101, an individual sampled error value ED is compared against a predetermined threshold value or an error amount $\alpha$ in a step 102. Although the threshold value $\alpha$ is set to represent the sudden hits, the threshold value should be sufficiently large to be insensitive to an insignificant noise. If the ED value is larger than the threshold value $\alpha$, the error correction coefficient SC2 is set to a predetermined coefficient value $\beta2$ in a step 104. On the other hand, if the ED value is smaller than the threshold value $\alpha$, the error correction coefficient SC2 is set to a predetermined coefficient value $\beta1$ for the normal data transmissions in step 103. The predetermined coefficient value $\beta2$ is larger than the predetermined coefficient value $\beta1$ so that the above described follow-up speed is increased to respond to the sudden bursts. As a result, the data loss is substantially minimized during the disruption caused by a sudden hit in the transmission.

Figures 5, 6:
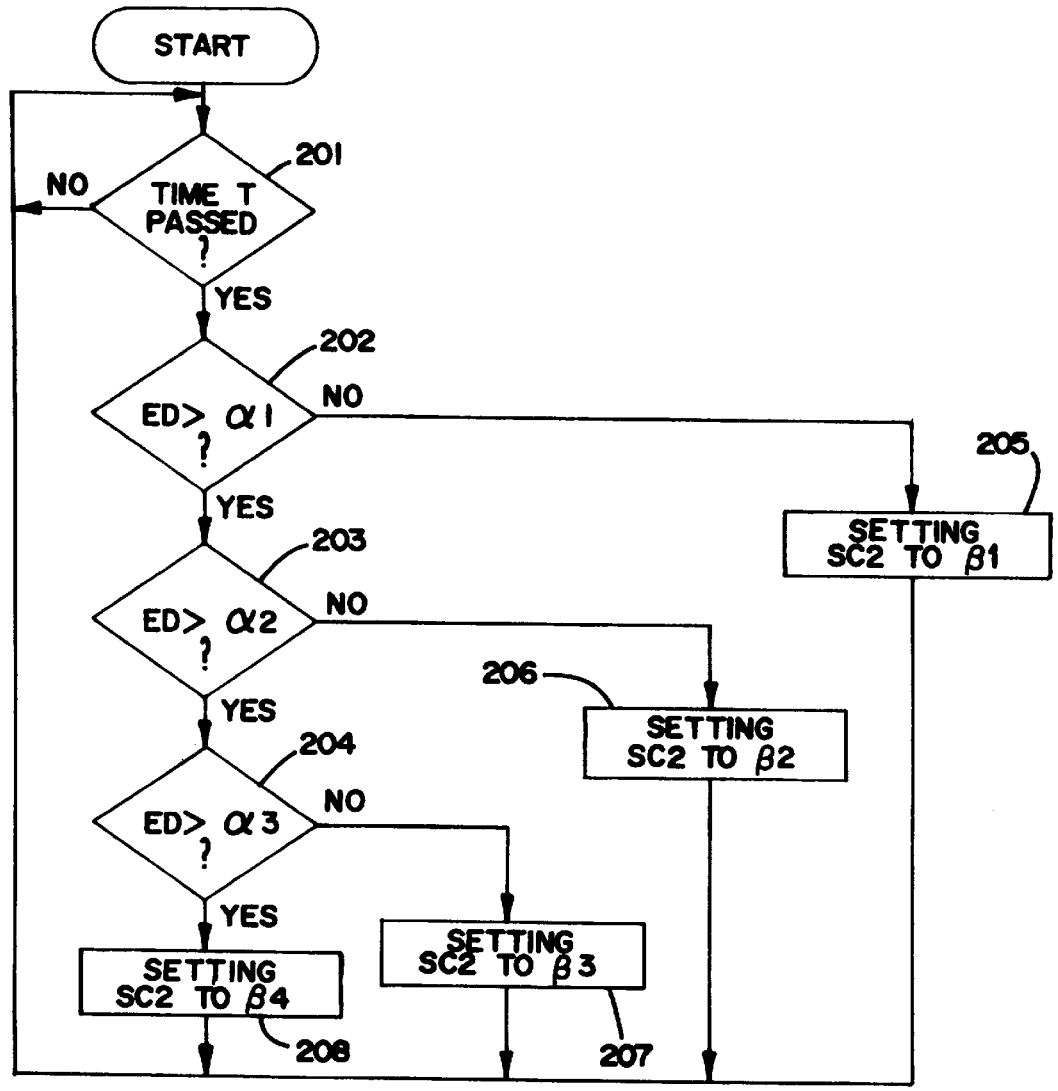
FIG. 5 is a table showing one preferred set of signal to noise ratios, threshold values and the corresponding error correction coefficients for various transmission speeds according to the current invention.
FIG. 6 is a flow chart illustrating one preferred process of modifying an error correction coefficient based upon a plurality of comparisons according to the current invention.

Now referring to FIG. 5, according to one preferred process of the current invention, the above described threshold value $\alpha$ as well as the above described predetermined coefficient values $\beta1$ and $\beta2$ all depend upon the data transmission speed. In general, the threshold value $\alpha$ is related to the signal to noise ratio (S/N) which is designed to have $10^{-4}$ data error occurrence, and the S/N ratio has approximately $\pm2$ db. The values shown in FIG. 5 are empirically determined for one preferred process of assigning the error correction coefficients $\beta1$ and $\beta2$. However, the above described thresholds and coefficients are not limited to the values shown in FIG. 5 to practice the current invention.

Referring to FIG. 6, another preferred process according to the current invention is described in a flow chart. In general, the second preferred process involves a number of comparisons between the individual sampled error value ED and the multiple thresholds $\alpha1$, $\alpha2$ and $\alpha3$. As described above, after a predetermined time T has passed in a step 201, a first comparison between the error value ED and the first threshold value $\alpha1$ is made in a step 202. If the ED value is not larger than $\alpha1$, the error correction coefficient SC2 is set to a predetermined coefficient $\beta1$. If the ED is larger than the $\alpha1$, the ED is now compared to a second predetermined threshold value $\alpha2$ in a step 203 to determine whether SC2 needs to be further updated. If the ED is larger than the $\alpha1$ but smaller than the $\alpha2$, the SC2 is updated to $\beta2$ in a step 206. Lastly, the ED is compared to a third predetermined threshold value $\alpha3$ in a step 204. If the ED value is larger than $\alpha2$ but smaller than $\alpha3$, the SC2 is set to $\beta3$ in a step 207. On the other hand, if the ED value is larger than $\alpha3$, the SC2 is set to $\beta4$ in a step 208.

Still referring to FIG. 6, the above multiple predetermined threshold values are used for responding to various sizes of sudden changes in the data transmission signal. According to the second preferred process, the multiple thresholds $\alpha1$ through $\alpha3$ have the following relation: $\alpha1<\alpha2<\alpha3$. Similarly, according to the second preferred process, the predetermined error coefficient values $\beta1$ through $\beta4$ are determined to be $\beta1<\beta2<\beta3<\beta4$. These corresponding relations allow a desirable increase in the follow-up speed depending upon the size of these abnormal signals during the transmission. In other words, the larger the spike or hit is, the higher the follow-up speed becomes to minimize the data loss.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts, as well as implementation in software, hardware, or a combination of both within the principles of the invention to the full extent indicated by the broad general meaning of the terms in which the appended claims are expressed.

What is claimed is:

1. A method of adjusting a data receiving condition for minimizing data receiving errors during data transmission, comprising the steps of:
   a) sampling data transmission errors;
   b) adjusting a data receiving control parameter based upon an average of the data transmission errors sampled in said step a), said adjusted data receiving control parameter minimizing the data receiving errors; and
   c) adjusting an error correction coefficient in response to one of said data transmission errors also sampled in said step a), said adjusted error correction coefficient modifying the data receiving control parameter in a substantially faster manner than said step b) during the data transmission.

2. The method of adjusting a data receiving condition according to claim 1 wherein said error correction coefficient in said step c) is adjusted when said one of said data transmission errors is larger than a predetermined error amount.

3. The method of adjusting a data receiving condition according to claim 2 wherein every one of said data transmission errors is compared to said predetermined error amount.

4. The method of adjusting a data receiving condition according to claim 3 wherein emery one of said data transmission errors is compared to a plurality of predetermined error amounts, each of said predetermined error amounts having a corresponding error correction coefficient value.

5. The method of adjusting a data receiving condition according to claim 1 wherein said error correction coefficient in said step c) is adjusted in substantially parallel to said step b).

6. The method of adjusting a data receiving condition according to claim 1 wherein said error correction coefficient in said step c) is adjusted in substantially independent from said step b).

7. The method of adjusting a data receiving condition according to claim 1 wherein said error correction coefficient is adjusted according to a transmission speed in said step c).

8. The method of adjusting a data receiving condition according to claim 7 wherein said error correction coefficient is adjusted according to a predetermined error amount associated with said transmission speed.

9. The method of adjusting a data receiving condition according to claim 1 wherein said error correction coefficient includes a plurality of error correction coefficient elements.

10. A method of correcting a phase error in data received by a modem during data transmission, comprising the steps of:
    a) sampling data transmission errors;
    b) determining an average amount of the phase error in the sampled data;
    c) slow adjusting the phase error based upon the average of the phase error; and
    d) fast adjusting the phase error by modifying a correction coefficient in response to one of said data transmission errors sampled in said step a), said adjusted error correction coefficient modifying the phase error in a substantially faster manner than said step c) during the data transmission.

11. A system for adjusting a data receiving condition for minimizing data receiving errors during data transmission, comprising:
    an error sampling unit for sampling data transmission errors;
    a slow error adjusting unit connected to said error sampling unit for adjusting a data receiving control parameter based upon an average of the data transmission errors, said adjusted data receiving control parameter minimizing the data receiving errors; and
    a fast error adjusting unit connected to said error sampling unit for adjusting an error correction coefficient in response to one of said data transmission errors, said adjusted error correction coefficient modifying the data receiving control parameter in a substantially faster manner than said slow error adjusting unit during the data transmission.

12. The system for adjusting a data receiving condition according to claim 11 wherein said fast error adjusting unit adjusts said error correction coefficient when said one of said data transmission errors is larger than a predetermined error amount.

13. The system for adjusting a data receiving condition according to claim 12 wherein said fast error adjusting unit compares every one of said data transmission errors to said predetermined error amount.

14. The system for adjusting a data receiving condition according to claim 13 wherein said fast error adjusting unit compares every one of said data transmission errors to a plurality of predetermined error amounts, each of said predetermined error amounts having a corresponding error correction coefficient value.

15. The system for adjusting a data receiving condition according to claim 11 wherein said fast error adjusting unit adjusts said error correction coefficient in substantially parallel to said slow adjusting unit.

16. The system for adjusting a data receiving condition according to claim 11 wherein said fast error adjusting unit adjusts said error correction coefficient substantially independent of said slow adjusting unit.

17. The system for adjusting a data receiving condition according to claim 11 wherein said fast error adjusting unit adjusts said error correction coefficient according to a transmission speed in said step c).

18. The system for adjusting a data receiving condition according to claim 17 wherein said fast error adjusting unit adjusts said error correction coefficient according to a predetermined error amount associated with said transmission speed.

19. The system for adjusting a data receiving condition according to claim 11 wherein said error correction coefficient includes a plurality of error correction coefficient elements.

20. A system for correcting a phase error in data received by a modem during data transmission, comprising:
    an error sampling unit for sampling data transmission errors;
    an error processing unit for determining an average amount of the phase error in the sampled data;
    a slow error correction unit connected to said error processing unit for adjusting the phase error based upon the average of the phase error; and
    a fast error correction unit connected to said error sampling unit for adjusting the phase error by modifying a correction coefficient in response to one of said data transmission errors, said adjusted error correction coefficient modifying the phase error in a substantially faster manner than said slow error correction unit during the data transmission.

* * * * *